United States Patent

Grove-Rasmussen et al.

[11] Patent Number: 6,156,683
[45] Date of Patent: *Dec. 5, 2000

[54] MAN-MADE VITREOUS FIBRES

[75] Inventors: Svend Grove-Rasmussen, Roskilde; Soren Lund Jensen, Holte; Vermund Rust Christensen, Roskilde; Marianne Guldberg, Soborg, all of Denmark

[73] Assignee: Rockwool International A/S, Denmark

[*] Notice: This patent is subject to a terminal disclaimer.

[21] Appl. No.: 09/125,565

[22] PCT Filed: Feb. 28, 1997

[86] PCT No.: PCT/EP97/01023

§ 371 Date: Aug. 20, 1998

§ 102(e) Date: Aug. 20, 1998

[87] PCT Pub. No.: WO97/31870

PCT Pub. Date: Sep. 4, 1997

[30] Foreign Application Priority Data

Feb. 29, 1996 [GB] United Kingdom .................. 9604264

[51] Int. Cl.$^7$ .............................. C03C 13/06; C03B 37/04
[52] U.S. Cl. .................. 501/35; 501/36; 501/70; 65/469; 65/470; 65/520
[58] Field of Search .................................. 501/35, 36, 70; 65/469, 470, 520

[56] References Cited

U.S. PATENT DOCUMENTS

| | | | |
|---|---|---|---|
| 4,560,606 | 12/1985 | Rapp et al. | 501/36 |
| 5,312,806 | 5/1994 | Mogensen | 501/36 |
| 5,601,628 | 2/1997 | Battigelli et al. | 65/461 |
| 5,691,255 | 11/1997 | Jensen et al. | 501/36 |
| 5,932,500 | 8/1999 | Jensen et al. | 501/36 |
| 5,935,886 | 8/1999 | Jensen et al. | 501/36 |

FOREIGN PATENT DOCUMENTS

| | | |
|---|---|---|
| 0583791 | 2/1994 | European Pat. Off. . |
| 29515168 | 3/1996 | Germany . |
| 160196 | 2/1993 | Poland . |
| 83/01947 | 6/1983 | WIPO . |
| 95/01941 | 1/1995 | WIPO . |

OTHER PUBLICATIONS

Chemical Abstracts, vol. 121, No. 24, Dec. 12, 1994, Columbus, OH, Abstract No. 285294.

*Primary Examiner*—Karl Group
*Attorney, Agent, or Firm*—Ostrolenk, Faber, Gerb & Soffen, LLP

[57] ABSTRACT

Man-made vitreous fibers have a solubility at pH 4.5 of at least 20 nm per day, a liquidus temperature of below 1300° C., a viscosity at the liquidus temperature of about 300 poise, and a composition which includes at least 15% by weight $Al_2O_3$.

21 Claims, No Drawings

MAN-MADE VITREOUS FIBRES

This invention relates to man-made vitreous fibres (MMVF) which are durable in use but which can be shown to be biologically advantageous.

MMV fibres are made from vitreous melt, such as of rock, slag, glass or other mineral melts. The melt is formed by melting in a furnace a mineral composition having the desired analysis. This composition is generally formed by blending rocks or minerals to give the desired analysis. The mineral composition often has an analysis, as oxides, which includes at least 32% $SiO_2$, below 30% $Al_2O_3$ and at least 10% CaO. The elemental analyses in the specification are by weight and calculated as oxides. The iron oxide may be a mixture of FeO and $Fe_2O_3$ but is quoted herein as FeO.

Efficient and cost-effective formation of the melt in the furnace and of the fibres from the melt requires that the composition should have a suitable liquidus temperature and should have a suitable viscosity during the fibre-forming process. These requirements impose constraints on the selection of the composition that is to be melted.

Although there is no scientific evidence establishing that there is a health risk associated with the manufacture and use of MMV fibres, commercial interests have led manufacturers to provide MMV fibres that retain the required physical properties of MMV fibres (e.g., durability at elevated temperatures and under humid conditions) but which can also be alleged to be of improved biological safety.

This allegation of improved safety is usually made on the basis of in-vivo tests. Biopersistence or durability in the lung is regarded as an important parameter for the possible health effect of man-made vitreous fibres. Often used methods for evaluating the biopersistence of fibres are the observation of the clearance of fibres (which could be all fibres, WHO-fibres, fibres longer than $20\mu$) after instillation or inhalation in rats. A typical result of such tests is the halftime of this clearance.

Based on in vivo research, some mechanisms have been recognised. For instance Oberdbrster in VDI Berichte 853, 1991, pages 17 to 37 showed that, in addition to mechanical clearance, the mechanisms could involve dissolution in the near-neutral lung fluid (around pH 7.5) and dissolution in the acidic environment (maintained at pH 4.5 to 5) created around fibres surrounded by macrophages in the lung. It is believed macrophages promote removal of the fibres from the lung by promoting local dissolution of the surrounded fibre area leading to weakening and breaking of the fibres so as to reduce the average fibre length, thereby enabling macrophages to engulf and transport the shorter fibres out of the lung. This mechanism is illustrated in the article by Morimoto et al in Occup. Environ. Med 1994, 51, 62–67 and especially FIGS. 3 and 7 and articles by Luoto et al in Environmental Research 66 (1994) 198–207 and Staub-Reinhaltung der Luft 52 (1992) 419–423. Other relevant references are Bellmann et al "Investigation on the durability of man-made vitreous fibers in rat lungs", Environ Health Perspect; 1994, 185–89; Bernstein D. et al "Evaluation of soluble fibers using the inhalation biopersistence model, a nin-fiber comparison", Inhalation Toxicology, 1996, 8, p.345–85, and Carr I. "The Macrophage—A Review of Ultrastructure and Function" New York: Academic Press, 1973.

Traditional glass fibres and many of the MMV fibres claimed to have increased solubility in lung fluid (at pH 7.5) have a worse solubility at pH 4.5 than at pH 7.5 and so presumably attack by macrophages would not contribute significantly to the shortening and final removal of the fibres from the lung.

The two different dissolution processes described above are simulated by in-vitro measurements. The in-vitro tests measures the dissolution rate or degradability of the fibres in a liquid which is intended to simulate the lung liquid, such as the Gamble's solution at a pH of 7.4–7.8 or the environment within the macrophages using a modified Gamble's solution, adjusted to the pH of 4.5–5 found inside the macrophages.

A consequence of enhanced dissolution rate at pH 7.5 is that the fibres will normally have reduced resistance to humidity.

Numerous patent applications have been published describing fibres that give enhanced dissolution rate in in vitro tests using neutral Gamble's solution. Examples are WO87/05007, WO89/12032, EP 412878, EP459897, WO92/09536, WO93/22251 and WO94/14717.

A characteristic of many of these patent applications, and of fibres which are alleged to have enhanced dissolution rate in such in vitro tests, is that the fibre should have reduced aluminium content. For instance, it is stated in WO87/05007 that the $Al_2O_3$ amount must be below 10%. The aluminium content of rock wool and slag wool is generally in the range 5 to 15% (measured as $Al_2O_3$ by weight) and many of these allegedly biologically suitable fibres have an aluminium content of below 4%, and often below 2%. It is known to include phosphorous in these low-$Al_2O_3$ compositions in order to increase the dissolution rate in this pH 7.5 dissolution rate test.

A problem with many of these low-$Al_2O_3$ fibres is that the melt properties are not entirely satisfactory for manufacture in conventional or easily adapted melting and fibre-forming apparatus. For instance, the melt viscosity at convenient fibre-forming temperatures may be rather low. Another problem is that a high dissolution rate at pH 7.5 may tend to result in reduced durability under humid conditions which may be experienced after installation.

Existing MMV fibres formed from rock, slag and other relatively high alkaline earth mixtures can have a higher dissolution rate at pH 4.5 than pH 7.5 but tend to have a low melt viscosity. Existing fibres do not have a satisfactory combination of dissolution rate at pH 4.5 with melt properties. Fibres which are currently alleged to be preferred on the basis of in vitro tests tend to have low melt viscosity when they have the required low aluminium content. The low melt viscosity inevitably reduces production efficiency compared to normal production.

It would be desirable to provide MMV fibres which can be biodegradable due to a demonstrated high dissolution rate at pH 4.5, and which have melt properties which allow for normal or improved production efficiency and which can be made from inexpensive raw materials. Preferably they have good weathering resistance when exposed to ambient humid conditions in use.

In WO96/14274 and WO96/14454 (unpublished at the priority date of this application,) we have described certain man-made vitreous fibres formed of a composition which has a viscosity at 1400° C. of 10 to 70 poise and which has an analysis, measured as weight of oxides, which includes

| | |
|---|---|
| $SiO_2$ | 32 to 48% |
| $Al_2O_3$ | 18 to 30% |
| CaO | 10 to 30% |
| MgO | 2 to 20% |
| FeO | 2 to 15% |
| $Na_2O + K_2O$ | 0 to 10% |

-continued

| | |
|---|---|
| TiO$_2$ | 0 to 6% |
| Other Elements | 0 to 15% | and the fibres have a dissolution rate at pH 4 to 5 of at least 20 nm per day. We have also described fibres as defined above except that the amount of Al$_2$O$_3$ is in the range 10 to 18% and the amount of Na$_2$O and X$_2$O is 6 to 12%.

It is surprisingly possible, in accordance with those applications, to provide fibres which have a low biopersistance as a result of having a good dissolution rate at pH 4.5, even though the fibres can have low or moderate dissolution rate at pH 7.5. This allows maintenance of good stability under humid conditions (without loss of biodegradability). The fibres can have reasonably conventional melt characteristics such as liquidus temperature, crystallisation rate and melt viscosity. The fibres can be formed using inexpensive raw materials.

Another advantage of the fibres is that when they are exposed to humidity and condensed water, the resultant solution that is formed containing dissolution products has increased pH but the fibres may have reduced solubility at increased pH and so they may dissolve less and have increased durability.

None of the fibres disclosed in these WO publications have the combination of viscosity at liquidus temperature, amount of Al$_2$O$_3$ and ratio of Si$^{4+}$ to Si$^{4+}$+Al$^{3+}$ which we now find to be desirable. Accordingly, the present invention provides further fibres having unique solubility properties such as those defined in the preceding applications, and additional properties.

According to the invention, we provide a product comprising man-made vitreous fibres formed of a composition which includes, by weight of oxides,

| | |
|---|---|
| SiO$_2$ | 36 to 55%, preferably 38 to 55% |
| Al$_2$O$_3$ | 15 to 30%, preferably 17 to 27% |
| CaO | 3 to 30%, preferably 5 to 20% |
| MgO | 5 to 20%, preferably 5 to 10% |
| FeO | 4 to 15%, preferably 4 to 10% |
| Na$_2$O + K$_2$O | 1 to 15%, preferably 5 to 12% |
| TiO$_2$ | 0 to 6%, preferably 1 to 4% |
| Other Elements | 0 to 15%, preferably 0 to 5% | and the ratio of Si$^{4+}$ to Si$^{4+}$+Al$^{3+}$ is in the range 0.55 to 0.67 and the composition has a viscosity of above 300 poise (preferably above 500 poise) and preferably below 3000 poise (more preferably below 2500 poise) at the liquidus temperature, and the composition has a liquidus temperature of below 1300° C., preferably below 1280° C., most preferably below 1250° C. and especially below 1230° C., and the fibres have a dissolution rate of at least 20 nm per day when measured at a pH of 4.5.

Best results are obtained with a liquidus temperature of above 1000° C., generally above 1100° C. and preferably above 1150° C.

The invention also includes the use of such fibres as biologically acceptable man-made vitreous fibres, and the invention also includes a package containing an MMV product wherein the fibres are as defined above and the package includes a label or insert, or is associated with advertising, referring to solubility at pH 4 to 5 and/or in an environment created by macrophage in lung fluid. Thus the reference may be to in vivo testing and may refer to low biopersistance, biological acceptability and a good (very low) carcinogenicity classification.

The invention also includes a method of making man-made vitreous fibre products comprising forming one or more mineral melts, determining the melt viscosity, liquidus temperature and fibre dissolution rate at a pH in the range 4 to 5 for the or each melt composition, selecting a composition which has a liquidus temperature, a viscosity at the liquidus temperature and an analysis as defined above and which provides fibres having a dissolution rate as defined above, and then utilising the selected composition for making the man-made vitreous fibres.

The amount of SiO$_2$ is normally at least 40%, often at least 42% and preferably at least 45%. It is normally below 50%.

The amount of Al$_2$O$_3$ is normally at least 17%, often at least 18% but preferably at least 19% or 20%. It is normally below 28% and preferably below 26%, especially not more than 24%. Amounts of 20 to 26% are often preferred.

The amount of CaO is normally 3 to 20%. The amount is usually at least 5%. When Al$_2$O$_3$ is below 20%, it can be preferred for the amount of CaO to be around 17 to 25%.

The ratio (molar) of Si$^{4+}$ to Si$^{4+}$+Al$^{3+}$ is in the range 0.55 to 0.67, most preferably above about 0.6 in order to obtain the desired solubility properties.

The amount of MgO is normally below 15%, preferably below 11%. Amounts of 5 to 10% are often preferred.

The amount of FeO is normally at least 5%. It is normally below 12%, preferably below 10% and most preferably below 8% or 9%. Amounts of 5 to 7% are often preferred.

Fibres according to the invention generally have good thermal stability, and when it is desired to provide fibres having improved fire resistance, it is generally desired to increase the amount of FeO, which preferably is then at least 6%, for instance up to 8% or higher, for instance 10%.

Preferably CaO+MgO+FeO is 15 to 30%, often 17 to 25%.

The combined amount of alkali (Na$_2$O+K$_2$O) is usually at least 3% and preferably at least 5%. It is usually below 12% and preferably below 10%.

The composition often includes TiO$_2$ in an amount of up to 3% or 4%, usually up to 2%. The amount of TiO$_2$ is usually at least 0.2%, often at least 0.5 or 1%.

A variety of other elements can be present in the composition in any amount that does not detract from the desired properties Examples of other elements that can be included are P$_2$O$_5$, B$_2$O$_3$, BaO, ZrO$_2$, MnO, ZnO and V$_2$O$_5$.

The total amount of these various other elements is usually below 15% and often below 10% or 8%. Each of the other elements which is present is normally present in an amount of not more than 4%, although P$_2$O$_5$ and/or B$_2$O$_3$ can be present in larger quantities.

The melt can have desirable crystallisation characteristics, but when it is desired to minimise crystallisation this can be achieved by including magnesium in a rather low amount for instance 5 to 10% MgO.

The analysis of the composition is preferably such that the fibres have a dissolution rate at pH 4.5 of at least 25, and most preferably at least 40, nm per day. It is desirable for the dissolution rate to be as high as possible (consistent with retention of adequate humidity and heat resistance properties) but it is generally unnecessary for it to be above 150 or 100 nm per day and it is usually below 80 nm per day.

If the rate of dissolution at pH 4.5 is too low, it may be possible to increase it by decreasing the amount of SiO$_2$, but it may then be necessary to increase the amount of $Al_2O_3$ in order to maintain melt properties.

It is possible to select elemental analyses within the ranges given herein so as to obtain the defined combination of liquidus viscosity and liquidus temperature and dissolution rate at pH 4.5. Also, it is easily possible to select the composition such that the composition and the fibres comply with other desirable properties, such as liquidus temperature and sintering temperature.

Although a high dissolution rate at pH 7.5 has been proposed as a desirable property (as an indication of alleged biodegradability), in fact it is often an undesirable property since it is an indication of poor weathering resistance when exposed to humidity. Dissolution in the lungs at pH 7.5 is not exclusively necessary for the fibres to be biodegradable. Preferably the fibres have a dissolution rate in Gambles solution at pH 7.5 of below 25, and most preferably below 15, nm per day.

When it is desired that the fibres should have particularly good fire resistance, the analysis is preferably such that the sintering temperature is at least 800° C. and preferably at least 900° C. or 1,000° C.

An advantage of the use of the moderate aluminium melts defined for use in the invention is that it permits the inclusion in the composition of readily available materials having a moderate aluminium content such as rock, sand and waste. This therefore minimises the need to use expensive, high alumina materials such as bauxite or kaolin, and minimises at the same time the need to use expensive very low alumina materials such as silica sand or olivine sand, iron ore, etc. These more expensive materials may however be used if desired. Typical, readily available, medium alumina materials that may be used as part or all of the composition include anorthosite and phonolite and gabbros.

The composition is typically formed by blending appropriate amounts of naturally occurring rock and sand materials such as anorthosite, gabbros, limestone, dolomite, diabase, apatite, boron-containing materials, and waste materials such as mineral wool waste, alumina silicates, slag, in particular high alumina (20–30%) slags such as ladle slag, foundry sand, filter dust, fly ash, bottom ash and high alumina waste from the production of refractory materials. The use of slag is particularly desirable from the ecological point of view.

The composition can be converted to a melt in conventional manner, for instance in a gas heated furnace or in an electric furnace or in a cupola furnace. An advantage of the invention is that the composition can easily have a reasonably low liquidus temperature (while maintaining adequate viscosity) and this aids in rendering the melt compositions suitable for fiberisation using all kind of fiberisation process, ranging from centrifugal processes such as Downey spinner processes, cascade spinner processes or cup processes or blown processes (Dusen-blasen) and processes where continuous fibres are drawn.

Among the centrifugal processes, the invention includes the manufacture of fibres by any suitable spinning cup process (for instance as described in U.S. Pat. No. 3,928,009, GB 895,540, GB 2,220,654, EP 484,211, EP 525,816, EP 583,792, EP 583,791 or U.S. Pat. No. 5,314,521).

Because of the relative low liquidus temperature and relatively high viscosity at the liquidus temperature, the crystallisation tendency for the melt according to the invention is low compared to other melts with the same solubility at pH 4.5 and good fire properties (high sintering temperature). This combination of low liquidus temperature and low crystallisation tendency is important for the above mentioned cup-process in relation to lifetime of the spinning cup and running cost of other process equipment. In these processes there will, for instance, be a direct contact between the hot fluid melt and the fiberizing unit (the spinning cup) and the special fibre properties can be reached at lower temperatures than if prior art melts were used.

The invention also includes the manufacture of fibres by the cascade spinning process, for instance as described in WO92/06047, U.S. Pat. No. 4,238,213 or 2,520,168, GB 1,559,117 or EP 320,005.

It is generally known that the cascade spinning process normally runs at a higher temperature than the spinning cup process. The cascade process does not usually involve direct contact, during the formation of fibres, between the metal or other material of which the spinning wheels are constructed and the fluid melt, while the melt is in the molten or fluid state. This is because the melt which is poured or thrown onto the periphery of the spinning wheels is cooled sufficient for the melt in contact with each wheel to create a solid, cooled, layer on the wheel, and the fiberising liquid melt layer then sticks to and is released from this solid layer.

The melt compositions used in the invention, because of their unusual liquidus properties, have an unusually low crystallisation tendency. This means that they result in the formation of the growth of a very thin layer of solid material on the melt. This very thin layer stabilises the cascade spinning process and can result in a reduction in the amount of shot and an improvement in the spinning yield and fibre quality obtained by the process.

Blowing processes of the invention can, for instance, be as described in EP 083,543, DE 35,09,426. These processes are similar to the spinning cup process in the way that the fluid melt is in direct contact with the nozzle from which the fibres are drawn, and the melt compositions according to the invention make it possible to operate at lower temperatures.

The product of the invention, and the product of the process of manufacture of the invention, is a mineral fibre product preferably comprising no more than 10 or 20 wt % shot, preferably no more than 5 wt % shot. In this specification, shot is defined as components having diameter above 63 $\mu$m. Particularly preferably the products comprise substantially no shot. Reduction in the amount of shot reduces the amount of waste of raw material and gives the product itself reduced harshness and improved uniformity. Measurement of shot content can be carried out based on DIN standard number 4188.

The fibres of the invention can have any convenient fibre diameter and length.

In this invention, dissolution rate is determined using the following test protocol.

300 mg of fibres are placed in polyethylene bottles containing 500 ml of a modified Gamble's solution (i.e., with completing agents), adjusted to pH 7.5 or 4.5, respectively. Once a day the pH is checked and if necessary adjusted by means of HCl.

The tests are carried out during a one week period. The bottles are kept in water bath at 37° C. and shaken vigorously twice a day. Aliquots of the solution are taken out after one and four days and analysed for Si on a Perkin-Elmer Atomic Absorption Spectrophotometer.

The modified Gamble's solution has the following composition:

|  | g/l |
|---|---|
| $MgCl_2 \cdot 6H_2O$ | 0.212 |
| NaCl | 7.120 |
| $CaCl_2 \cdot 2H_2O$ | 0.029 |
| $Na_2SO_4$ | 0.079 |
| $Na_2HPO_4$ | 0.148 |
| $NaHCO_3$ | 1.950 |
| $(Na_2$-tartrate$) \cdot 2H_2 \cdot O$ | 0.180 |
| $(Na_3$-citrate$) \cdot 2H_2O$ | 0.152 |
| 90% lactic acid | 0.156 |
| Glycine | 0.118 |
| Na-pyruvate | 0.172 |
| Formalin | 1 ml |

The fibre diameter distribution is determined for each sample by measuring the diameter of at least 200 individual fibres by means of the intercept method and a scanning electron microscope or optical microscope (1000× magnification). The readings are used for calculating the specific surface of the fibre samples, taking into account the density of the fibres.

Based on the dissolution of $SiO_2$ (network dissolution), the specific thickness dissolved was calculated and the rate of dissolution established (nm/day). The calculations are based on the $SiO_2$ content in the fibres, the specific surface and the dissolved amount of Si.

In this specification, the sintering temperature is determined by the following test protocol.

A sample (5×5×7.5 cm) of mineral wool made by a spinning cup process of the fibre composition to be tested is placed in a furnace pre-heated to 700° C. After 1.5 hours exposure, the shrinkage and the sintering of the sample are evaluated. The method is repeated each time with a fresh sample and a furnace temperature 50° C. above the previous furnace temperature until the maximum furnace temperature is determined, at which no sintering or no excessive shrinkage of the sample is observed.

In this specification, the viscosity in poise at liquidus temperature is calculated according to Bottinga and Weill, American Journal of Science Volume 272, May 1972, page 455–475.

The following are examples of the invention.

of a cascade of spinning wheels (generally 3 or 4 wheels) and is thereby thrown off the wheels as fibres.

The novel fibres may be provided in any of the forms conventional for MMV fibres. Thus they may be provided as a product consisting of loose, unbonded fibres. More usually they are provided with a bonding agent, for instance as a result of forming the fibres and connecting them in conventional manner. Generally the product is consolidated as a slab, sheet or other shaped article.

Products according to the invention may be formulated for any of the conventional purposes of MMV fibres, for instance as slabs, sheets, tubes or other shaped products that are to serve as thermal insulation, fire insulation and protection or noise reduction and regulation, or in appropriate shapes for use as horticultural growing media, or as free fibres for reinforcement of cement, plastics or other products or as a filler.

What is claimed is:

1. A product comprising man-made vitreous fibres formed of a composition which includes, by weight of oxides,

| $SiO_2$ | 36 to 55% |
|---|---|
| $Al_2O_3$ | 15 to 30% |
| CaO | 3 to 30% |
| MgO | 5 to 20% |
| FeO | 4 to 15% |
| $Na_2O + K_2O$ | 1 to 12% |
| $TiO_2$ | 0 to 6% |
| Other Elements | 0 to 15% | and in which the ratio $Si^{4+}$ to $Si^{4+}+Al^{3+}$ is below 0.67 and the composition has a viscosity at the liquidus temperature of above 300 poise and a liquidus temperature below 1300° C.

and the fibres have a dissolution rate of at least 20 nm per day when measured at a pH of 4.5.

2. A product according to claim 1 in which the composition analysis includes

| $SiO_2$ | 38 to 50% |
|---|---|
| $Al_2O_3$ | 17 to 27% |

|  | 1 | 2 | 3 | 4 | 5 | 6 | 7 | 8 | 9 | 10 |
|---|---|---|---|---|---|---|---|---|---|---|
| $SiO_2$ (wt %) | 45.5 | 46.2 | 45.8 | 45.4 | 42.4 | 42.7 | 43.4 | 43.2 | 44.8 | 43.3 |
| $Al_2O_3$ (wt %) | 20.9 | 23.6 | 26.0 | 25.3 | 23.8 | 25.5 | 25.6 | 18.2 | 18.6 | 23.8 |
| $TiO_2$ (wt %) | 1.8 | 1.9 | 2.1 | 0.9 | 0.9 | 1.2 | 1.4 | 0.5 | 1.9 | 1.3 |
| FeO (wt %) | 7.3 | 7.5 | 6.3 | 1.9 | 8.7 | 9.6 | 7.2 | 7.1 | 7.2 | 13 |
| CaO (wt %) | 10.9 | 7.5 | 8.3 | 13.7 | 12.9 | 9.6 | 9.9 | 13.3 | 12 | 7.6 |
| MgO (wt %) | 5.5 | 5.7 | 6.3 | 4.2 | 4.0 | 3.4 | 4.9 | 5.6 | 6.6 | 3.7 |
| $Na_2O$ (wt %) | 7.3 | 6.6 | 4.2 | 8.0 | 6.8 | 7.3 | 6.8 | 11.5 | 7.2 | 5.4 |
| $K_2O$ (wt %) | 0.9 | 0.9 | 1.0 | 0.6 | 0.6 | 0.7 | 0.7 | 0.5 | 1.8 | 1.8 |
| Tliq (° C.) | 1192 | 1208 | 1281 | 1235 | 1207 | 1238 | 1244 | 1167 | 1205 | 1196 |
| $Si^{4+}/Si^{4+} + Al^{3+}$ | 0.648 | 0.624 | 0.599 | 0.6034 | 0.6016 | 0.5869 | 0.5899 | 0.67 | 0.67 | 0.61 |
| VisLiq (poise) | 1429 | 1460 | 542 | 1324 | 1131 | 972 | 858 | 642 | 759 | 1.378 |

The fibres having not more than 23.6% $Al_2O_3$ are preferred.

Preferably the melt is spun at a temperature at least 30° C., preferably 50 to 100° C. or more, above the liquidus temperature. It may be poured onto the first spinning wheel -continued

| $SiO_2 + Al_2O_3$ | 63 to 80% |
|---|---|
| CaO | 5 to 20% |

-continued

| | |
|---|---|
| MgO | 5 to 10% |
| FeO | 4 to 10% |
| Na$_2$O + K$_2$O | 5 to 10% |
| TiO$_2$ | 0 to 4% |
| Other Elements | 0 to 10% | and a liquidus temperature of 1150° C. to 1250° C. and a liquidus viscosity of 500–2500 poise.

3. A product according to claim 1 in which the ratio Si$^{4+}$ to Si$^{4+}$+Al$^{3+}$ is 0.55 to 0.67.

4. A product according to claim 1 comprising not more than 10 wt % shot of size at least 63 μm.

5. A product according to claim 1 in which the fibres have a sintering temperature of at least 800° C.

6. A process for making a product comprising man-made vitreous fibres having a dissolution rate of at least 20 nm per day when measured at a pH of 4.5 comprising pouring a melt into a spinning cup having perforations in its side walls and thereby throwing fibres out through the perforations and collecting the fibres, wherein said melt has a composition which includes, by weight of oxides,

| | |
|---|---|
| SiO$_2$ | 36 to 55% |
| Al$_2$O$_3$ | 15 to 30% |
| CaO | 3 to 30% |
| MgO | 5 to 20% |
| FeO | 4 to 15% |
| Na$_2$O + K$_2$O | 1 to 12% |
| TiO$_2$ | 0 to 6% |
| Other Elements | 0 to 15% | and in which the ratio Si$^{4+}$ to Si$^{4+}$+Al$^{3+}$ is below 0.67 and the composition has a viscosity at the liquidus temperature of above 300 poise and a liquidus temperature below 1300° C.

7. A process for making a product comprising man-made vitreous fibres having a dissolution rate of at least 20 nm per day when measured at a pH of 4.5 by a cascade spinning process wherein a melt is poured onto the first spinning wheels of a cascade of spinning wheels and is thrown off the wheel as fibres, wherein said melt has a composition which includes, by weight of oxides,

| | |
|---|---|
| SiO$_2$ | 36 to 55% |
| Al$_2$O$_3$ | 15 to 30% |
| CaO | 3 to 30% |
| MgO | 5 to 20% |
| FeO | 4 to 15% |
| Na$_2$O + K$_2$O | 1 to 12% |
| TiO$_2$ | 0 to 6% |
| Other Elements | 0 to 15% | and in which the ratio Si$^{4+}$ to Si$^{4+}$+Al$^{3+}$ is below 0.67 and the composition has a viscosity at the liquidus temperature of above 300 poise and a liquidus temperature below 1300° C.

8. A package containing a man-made vitreous fibre product as defined in claim 1 and which includes a label or insert, or is associated with advertising, referring to solubility at pH 4 to 5 or in an environment created by macrophages in lung fluid or both.

9. A package containing a man-made vitreous fibre product as defined in claim 1 and which includes a label or insert, or is associated with advertising, referring to in vivo solubility.

10. A product according to claim 4 comprising not more than 5 weight percent shot of size less than 63 μm.

11. A product according to claim 5 in which the fibres have a sintering temperature of at least 1000° C.

12. A product according to claim 2 in which the ratio Si$^{4+}$ to Si$^{4+}$+Al$^{3+}$ is 0.55 to 0.67.

13. A product according to claim 12 comprising not more than 10 weight percent shot of size at least 63 μm and in which the fibres have a sintering temperature of at least 800° C.

14. A product according to claim 13 comprising not more than 5 weight percent shot of size at least 63 μm and in which the fibres have a sintering temperature of at least 1000° C.

15. A process of making a product comprising man-made vitreous fibres which comprises selecting a mineral melt composition which has a viscosity at the liquidus temperature of above 300 poise and a liquidus temperature below 1300° C. and provides fibres which have a dissolution rate of at least 20 nm per day when measured at a pH of a composition which includes, by weight of oxides,

| | |
|---|---|
| SiO$_2$ | 36 to 55% |
| Al$_2$O$_3$ | 15 to 30% |
| CaO | 3 to 30% |
| MgO | 5 to 20% |
| FeO | 4 to 15% |
| Na$_2$O + K$_2$O | 1 to 12% |
| TiO$_2$ | 0 to 6% |
| Other Elements | 0 to 15% | wherein the ratio Si$^{4+}$ to Si$^{4+}$+Al$^{3+}$ is below 0.67, and forming fibres from the mineral melt composition.

16. The process of claim 15 wherein the mineral melt composition includes, by weight of oxides,

| | |
|---|---|
| SiO$_2$ | 38 to 50% |
| Al$_2$O$_3$ | 17 to 27% |
| SiO$_2$ + Al$_2$O$_3$ | 63 to 80% |
| CaO | 5 to 20% |
| MgO | 5 to 10% |
| FeO | 4 to 10% |
| Na$_2$O + K$_2$O | 5 to 10% |
| TiO$_2$ | 0 to 4% |
| Other Elements | 0 to 10% | and liquidus temperature of 1150° C. to 1250° C. and a liquidus viscosity of 500–2500 poise.

17. A process according to claim 15 in which the ratio Si$^{4+}$ to Si$^{4+}$+Al$^{3+}$ is 0.55 to 0.67.

18. The process of claim 6 wherein the mineral melt composition includes by weight of oxides the composition includes, by weight of oxides,

| | |
|---|---|
| SiO$_2$ | 38 to 50% |
| Al$_2$O$_3$ | 17 to 27% |
| SiO$_2$ + Al$_2$O$_3$ | 63 to 80% |
| CaO | 5 to 20% |
| MgO | 5 to 10% |
| FeO | 4 to 10% |
| Na$_2$O + K$_2$O | 5 to 10% |
| TiO$_2$ | 0 to 4% |
| Other Elements | 0 to 10% | and liquidus temperature of 1150° C. to 1250° C. and a liquidus viscosity of 500–2500 poise.

19. A process according to claim 6 in which the ratio $Si^{4+}$ to $Si^{4+}+Al^{3+}$ is 0.55 to 0.67.

20. The process of claim 7 wherein the mineral melt composition includes by weight of oxides the composition includes, by weight of oxides,

| | |
|---|---|
| $SiO_2$ | 38 to 50% |
| $Al_2O_3$ | 17 to 27% |
| $SiO_2 + Al_2O_3$ | 63 to 80% |
| CaO | 5 to 20% |
| MgO | 5 to 10% |
| FeO | 4 to 10% |
| $Na_2O + K_2O$ | 5 to 10% |
| $TiO_2$ | 0 to 4% |
| Other Elements | 0 to 10% | and liquidus temperature of 1 150° C. to 1250° C. and a liquidus viscosity of 500–2500 poise.

21. A process according to claim 7 in which the ratio $Si^{4+}$ to $Si^{4+}+Al^{3+}$ is 0.55 to 0.67.

* * * * *